(12) United States Patent
Igarashi et al.

(10) Patent No.: US 6,347,995 B1
(45) Date of Patent: Feb. 19, 2002

(54) METHOD, COMPUTER-READABLE STORAGE MEDIUM AND VIDEO GAME DEVICE FOR AUTOMATICALLY GENERATING A MAZE MAP WITH AT LEAST ONE CORRECT PATH

(75) Inventors: Koji Igarashi; Kota Wakasa, both of Tokyo (JP)

(73) Assignees: Konami Corporation; Konami Computer Entertainment Tokyo Inc., both of Tokyo (JP)

(*) Notice: Subject to any disclaimer, the term of this patent is extended or adjusted under 35 U.S.C. 154(b) by 0 days.

(21) Appl. No.: 09/676,666

(22) Filed: Oct. 2, 2000

(30) Foreign Application Priority Data

Sep. 30, 1999 (JP) .......................................... 11-280745

(51) Int. Cl.$^7$ .......................... A63F 13/00; A63F 9/24; G06F 17/00; G06F 19/00
(52) U.S. Cl. ............................... 463/15; 463/1; 463/7; 463/9; 273/153 R; 273/237; 345/118; 345/418; 345/419
(58) Field of Search ............................... 463/15, 7, 9, 1, 463/2, 36, 37, 43, 46, 47; 273/153 R, 157 R, 153 P, 109, 237; 345/418, 419, 433, 118, 133

(56) References Cited

U.S. PATENT DOCUMENTS

| 3,625,516 A | * | 12/1971 | Handweller et al. ..... 273/153 R |
| 4,089,524 A | * | 5/1978 | Hauck ....................... 273/85 G |
| 4,240,638 A | * | 12/1980 | Morrison et al. ........ 273/237 X |
| 4,323,242 A | | 4/1982 | Rosenfeld .................... 273/153 |
| 4,341,385 A | * | 7/1982 | Doyle et al. ............. 273/237 X |
| 4,511,143 A | * | 4/1985 | Sankrithi ................ 273/153 R |
| 4,674,753 A | * | 6/1987 | Hochstim ............... 273/258 X |
| 4,850,592 A | * | 7/1989 | Winter .................... 273/109 X |
| 5,050,883 A | * | 9/1991 | Goldfarb et al. ........ 273/153 R |
| RE35,314 E | * | 8/1996 | Logg .......................... 463/2 X |
| 6,273,420 B1 | * | 8/2001 | Brooks ................... 273/153 R |

* cited by examiner

Primary Examiner—Jessica J. Harrison
Assistant Examiner—Binh-An Nguyen
(74) Attorney, Agent, or Firm—Sughrue Mion, PLLC

(57) ABSTRACT

Method, computer-readable storage medium and video game device are provided for generating a maze map. First, a floor composed of plural rectangular blocks is generated. Next, one of the blocks is designated from the floor as the start block. Then, a sequence of blocks is designated from the floor as a trunk path starting from the start block. After that, at least one block is designated as an intersection block from the trunk path. Finally, at least one sequence of blocks is designated from the floor as a branch path starting from the intersection block.

15 Claims, 14 Drawing Sheets

Maze generating process 1

Maze generating process 1

North

| 56 | 57 | 58 | 59 | 60 | 61 | 62 | 63 |
| 48 | 49 | 50 | 51 | 52 | 53 | 54 | 55 |
| 40 | 41 | 42 | 43 | 44 | 45 | 46 | 47 |
| 32 | 33 | 34 | 35 | 36 | 37 | 38 | 39 |
| 24 | 25 | 26 | 27 | 28 | 29 | 30 | 31 |
| 16 | 17 | 18 | 19 | 20 | 21 | 22 | 23 |
| 8 | 9 | 10 | 11 | 12 | 13 | 14 | 15 |
| 0 | 1 | 2 | 3 | 4 | 5 | 6 | 7 |

East / West

South

FIG.3

| Block No.. | Connection flag |
|---|---|
| 9 | 1100 |
| 10 | 1011 |
| 11 | 1100 |
| 17 | 0000 |
| 18 | 0101 |
| 19 | 1010 |
| 25 | 1010 |
| 26 | 0000 |
| 27 | 0100 |

METHOD, COMPUTER-READABLE STORAGE MEDIUM AND VIDEO GAME DEVICE FOR AUTOMATICALLY GENERATING A MAZE MAP WITH AT LEAST ONE CORRECT PATH

BACKGROUND OF THE INVENTION

1. Field of the Invention

The present invention relates to method, computer program and video game device for creating a maze map that includes a start point and a goal point. The start and goal points should be connected with each other via at least one route.

2. Description of the Related Art

In video games, a lot of kinds of map are represented as maze maps. For example, maze maps represent a dungeon, a cave, a town, a building, etc.

Distribution media of some video games record predetermined data of maze maps. In these video games, maze maps are displayed according to the predetermined data so that the maze maps are fixed as a general.

Instead of the predetermined data of maze maps, distribution media of other video games record maze generator programs, which generate data of random maze maps within predetermined size. If the predetermined size of maze map is enough large, the maze generator program does not generate same maze map substantially. The maze generator program may change a maze map of one building each time when the player of the video game enters the building. The maze generator program can prevent boring the player of the video game.

Description will be made about typical maze generator program. First, the program divides a screen into m*n rectangular areas in each of which at most one room is locatable. Next, the program decides whether a room is located or not in each areas at random, and decides sizes and positions of the rooms to be located at random. Then, the program decides whether a path is located between two rooms in adjacent areas or not, and decides the route of the paths to be located at random. Here at least one path is connected to each room in order that no room is isolated from other rooms.

Complexity of maze largely depends on complexity of the paths. According to the typical maze generator program mentioned above, however, the paths are located after the rooms are located so that the routes of the paths are tightly limited. Consequently, complexity of maze is limited so that similar mazes tend to be generated frequently.

SUMMARY OF THE INVENTION

It is an object of the present invention to provide a method, a recording medium recorded a video game program, and a video game device for automatically generating data of maze map with higher complexity.

According to the present invention, a method, a computer-readable storage medium and a video game device as following are provided.

The present invention provides a method of automatically generating a maze map by computer. The maze map includes at least one floor that is composed of arrayed rectangular blocks. The floor includes a start block and a goal block, the start and goal blocks being connected with each other via at least a trunk path. The method comprises the steps of: (a) generating the floor composed of plural rectangular blocks; (b) designating one of the blocks from the floor as the start block; (c) designating a trunk path which is a sequence of blocks designated from the floor and which starts from the start block; (d) designating at least one block as an intersection block from the trunk path; and (e) designating at least one branch path which is a sequence of blocks designated from the floor and which starts from the intersection block.

According to the method, the floor may be a two-dimensional array composed of m×n rectangular blocks (m and n are natural numbers).

When the trunk path is composed of X rectangular blocks (X is a natural number) $B_1, B_2, B_3 \ldots B_x$, the step (c) may designate the blocks $B_1, B_2, B_3 \ldots B_x$ according to the steps of: (c1) designating the start block $B_1$ as the current block which has been currently selected as one block of the trunk path; (c2) selecting one of the blocks adjacent to the current block; (c3) designating the selected block as the next current block; and (c4) repeating the steps (c2) and (c3) until the block $B_x$ is designated.

When the branch path is composed of X rectangular blocks (X is a natural number) $B_1, B_2, B_3 \ldots B_x$, the step (e) may designate the blocks $B_1, B_2, B_3 \ldots B_x$ according to the steps of: (e1) designating the intersection block $B_1$ as the current block which has been currently selected as one block of the branch path; (e2) selecting one of the blocks adjacent to the current block; (e3) designating the selected block as the next current block; and (e4) repeating the steps (e2) and (e3) until the block $B_x$ is designated.

Further, the present invention provides a computer-readable storage medium and a video game device for generating a maze map according to the above-mentioned method.

BRIEF DESCRIPTION OF THE DRAWINGS

FIG. 3 shows a floor that is composed of 8×8 blocks.

FIG. 11 is the floor shown in FIG. 3 for describing the trunk path generating process S103.

FIG. 12 is the floor shown in FIG. 3 for describing the trunk path generating process S103.

DESCRIPTION OF THE PREFERRED EMBODIMENTS (1) Video Game System 100

Figure 1:
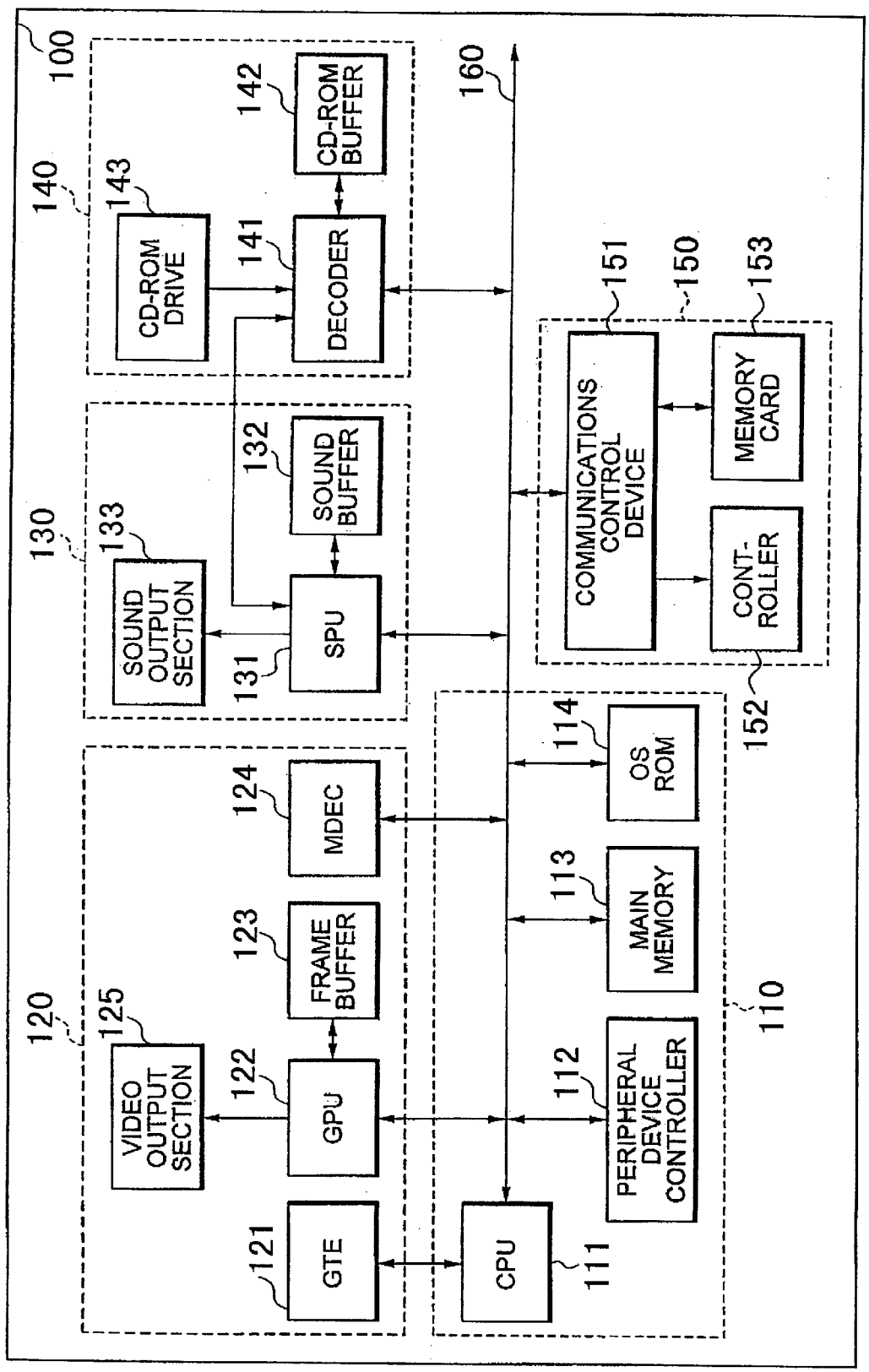
FIG. 1 shows a block-diagram of preferred video game system 100 for maze generating program of the present invention.

Description will be made about an embodiment of the present invention. This embodiment is a video game system 100 as shown in FIG. 1.

The video game system 100 comprises: a control section 110 for controlling the operation of the whole device; an image processing section 120 for performing processing relating to image display; a sound processing section 130 for performing processing relating to sound output; an auxiliary memory control section 140 for reading out game programs and various data from a storage medium; a communications control section 150 for reading and writing data, such as player operations, game settings, game status, and the like, and controlling input and output of other data; and a main bus 160 for connecting from the aforementioned control section 110 to the communications control section 150.

Next, the internal elements of the system from the control section 110 to the communications control section 150 is described.

The control section 110 comprises: a CPU 111; a peripheral device controller 112 for performing interrupt control, time control, memory control, direct memory access (DMA) transfer control, and the like; a main storage medium (main memory) 113 consisting of a RAM; and a ROM 114 storing a program, such as an operating system (OS), or the like, for controlling the main memory 113, image processing section 120 and sound processing section 130, and the like. The CPU 111 controls the whole device by executing the OS stored in the ROM 114. The CPU 111 is also equipped with a command cache and a scratch-pad memory, and it manages the actual memory.

The image processing section 120 comprises a geometry transfer engine (GTE) 121 consisting of a co-ordinates calculating co-processor for performing processing, such as co-ordinates conversion, or the like; a graphics processing unit (GPU) 122 for performing drawing in accordance with drawing commands from the CPU 111; a frame buffer 123 for storing images drawn by the GPU 122; an image decoder (MDEC) 124 for decoding image data which has been directly converted by so-called discrete cosine transform, or the like, and then further compressed and encoded; and a video output section 125, such as a display device, or the like.

The sound processing section 130 includes: a sound reproduction processor (SPU) 131 for generating sounds based on instructions from the CPU 111; a sound buffer 132 for storing data for sounds, music, and the like, and sound source data, read out from a CD-ROM; and a sound output section 133, such as an amplifier, speaker, and the like, for outputting the sounds generated by the SPU 131.

The auxiliary storage control section 140 comprises: a CD-ROM drive device 143 for reproducing programs, data, and the like, stored on a CD-ROM disk; a decoder 141 for decoding programs, data, and the like, stored with an appended error correction code (ECC), for example; and a CD-ROM buffer 142 for temporarily storing data reproduced by the CD-ROM drive device 143.

The communications control section 150 comprises: a communications control device 151 for controlling communications with the CPU 111 through the main bus 160; a controller 152 for inputting instructions from a user; and a detachable memory card 153, which is a readable and writable storage medium for storing game settings, and the like.

Next, the basic operation of the video game system 100 will be described.

When the power supply to the video game system 100 is switched on, the OS stored in the ROM 114 is executed by the CPU 111, and the image processing section 120, sound processing section 130, and the like, are put into active states under the control of the OS. Firstly, the OS performs initialization, such as operational verification, and the like, of the overall device, whereupon it controls the auxiliary storage control section 140 and executes a game program stored on a CD-ROM accommodated in the CD-ROM drive device 143.

Then, the CPU 111 controls the image processing section 120, sound processing section 130, and the like, in accordance with the game program being executed and the inputs performed by the player via the controller 152, and it displays images by the video output section 125, whilst also outputting sounds, such as sound effects, music, and the like, by the sound output section 133. If the game is temporarily suspended, then the current game status is written to the memory card 153 as saved data. When a suspended game is restarted, this saved data is read out and the status of the game in progress is recreated.

The maze generating process of the present invention is incorporated into a video game program recorded in a CD-ROM disk as a maze generator program. According to the maze generator program, the CPU 111 generates data that represents a structure of a maze. According to the data, the GTE 121 and the GPU 122 generate image signals for drawing two/three-dimensional maze. The image signals are merged with other image signals and output to the video output section 125 as video signals.

(2) Maze Generating Process

Figure 2:
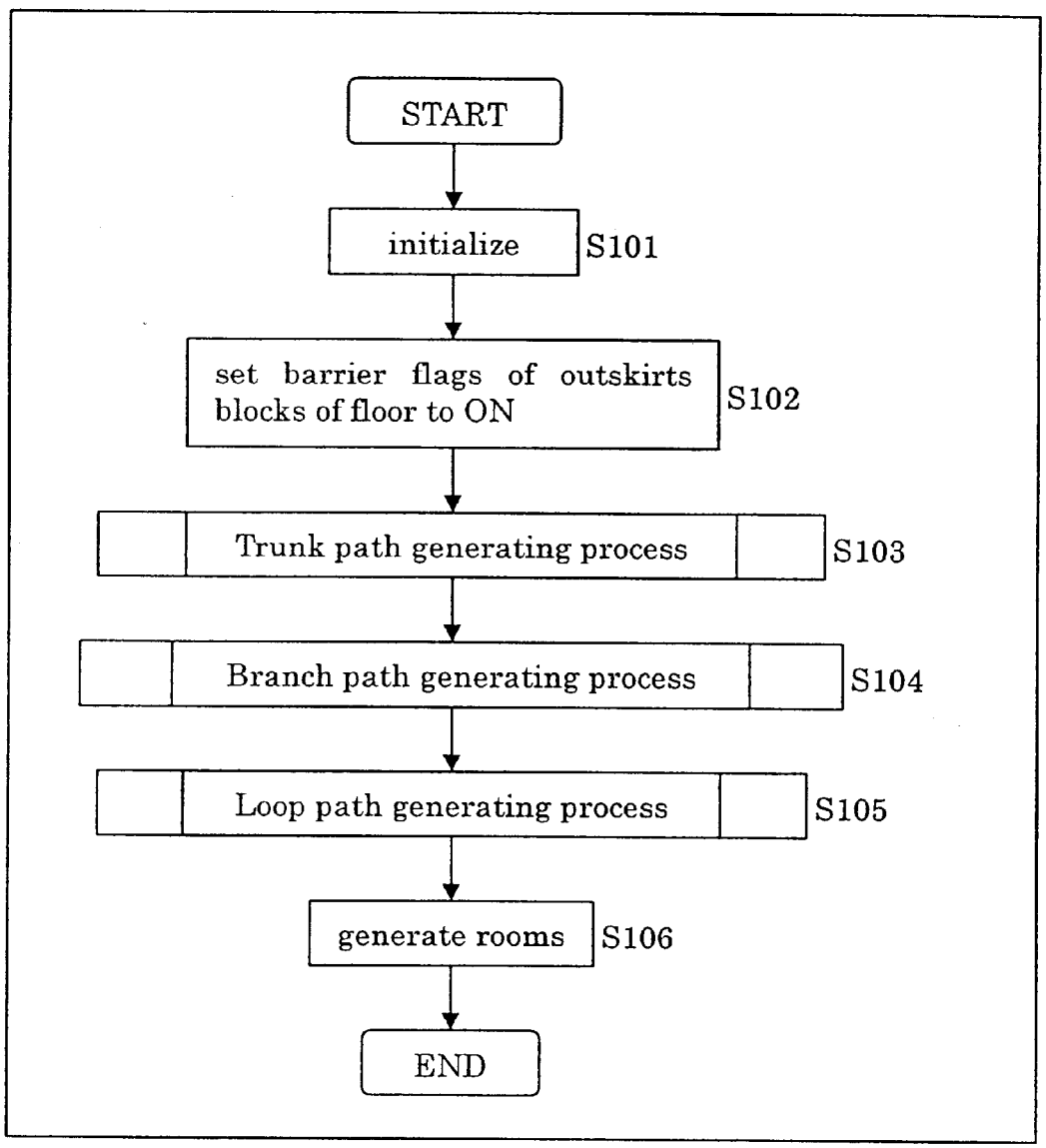
FIG. 2 is a summarized flowchart of maze generating process of the present invention.

Turning now to FIG. 2, the process of the maze generator program 1 will be described hereinafter. Roughly speaking, the maze generator program 1 comprises steps S101 through S106. In the description below, the maze generator program 1 generates a maze on a floor composed of 8×8 blocks as shown in FIG. 3. The number written in each of the blocks is called as a block number. The maze includes a trunk path and a plurality of branch paths. The trunk path connects a start block and a goal block. The branch paths are extended from the trunk path to a dead-end block. All paths have one block width.

Figure 4:
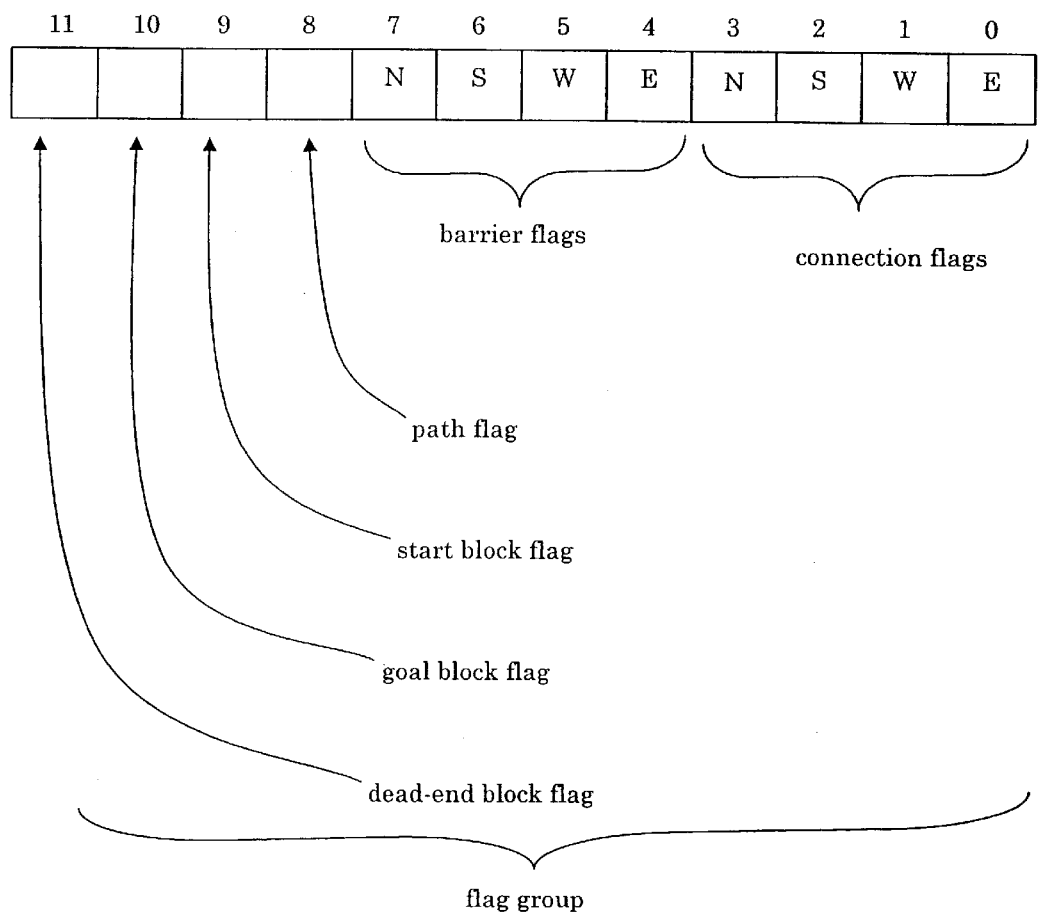
FIG. 4 shows a structure of a flag group that is assigned to each block shown in FIG. 3.

Each of the blocks is related to a group of flags. The group of flags is called as a flag group hereinafter. As shown in FIG. 4, one flag group is composed of twelve flags (bit [0] through bit [11]).

Each of the bits [0], [1], [2] and [3] corresponding to directions east, west, south and north is named as a connection flag. A connection flag represents that the block forms a part of a path with a block adjacent to the block toward its corresponding direction.

Each of the bits [4], [5], [6] and [7] corresponding to directions east, west, south and north is named as a barrier flag. A barrier flag represents that its corresponding direction of the block is unavailable for generating a path.

The bit [8] is named as a path flag and represents that the block is a part of a path.

The bit [9] is named as a start block flag representing that the block is the start block of the maze.

The bit [10] is named as a goal block flag representing that the block is the goal block of the maze.

The bit [11] is named as a dead-end block flag representing that the block is the dead-end block.

Figures 5, 6:
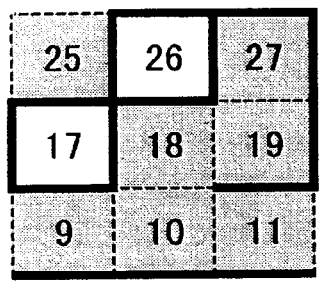
FIG. 5 is a part of the floor shown in FIG. 3 for describing relationship between structure of maze and values in a flag group.
FIG. 6 is a table storing values of connection flags for describing relationship between structure of maze and values in a flag group.

According to the maze generator program 1, a map of maze is represented as a plurality of flag groups. In a part of a map shown in FIG. 5, dark blocks (block No.=9, 10, 11, 18, 19, 25) represent that each of them is a part of a path. White blocks (block No.=17, 26) represent that each of them is impassable block, such as a wall or a pillar of the maze. This map is represented as connection flags shown in FIG. 6. For example, as shown in FIG. 5, the block 18 connects with the blocks 10 and 19 and is divided from the blocks 17 and 26. On the other hand, as shown in FIG. 6, The connection flags of the block 18 "0101"; the bits [0] and [2] are ON (1) and the bits 1 and 3 are OFF (0).

Turning again to FIG. 2, each of STEPS S101 through S106 will be roughly described below.

At STEP S101, following values are determined as initial-values for generating a maze; trunk path length dis, the number of branch paths bc, the number of loops Ip, block number of the start block st. The trunk path length dis represents the number of blocks that are composed of a trunk path from a start block through a goal block. The number of branch path bc represents the number of branch paths that extend from the trunk path. The number of loop Ip represents the number of ringed paths in the maze. The block number of a start block st represents the block number of the start block of the maze.

Furthermore, variables are initialized as following. Hereinafter, a flag group related to a block number n is represented as f [n]. All flags (bit [0] through bit [11]) of f [0] through f [63] are set to zero except that the start block flag of the start block, namely, the bit [9] of the flag group f [st] is set to one.

At STEP S102, the barrier flags corresponding to the sides of the floor are set to ON in order to inhibit from generating a path out of the floor. With referring to FIG. 3, each bit [6] of the south side blocks 0 through 7 is set to ON. Similarly, each bit [4] of the east side blocks 7, 15, 23, 31, 39, 47, 55 and 63 is set to ON. Each bit [5] of the west side blocks 0, 8, 16, 24, 32, 40, 48 and 56 is set to ON. Each bit [7] of the north side blocks is set to ON.

At STEP S103, a trunk path generating process is executed. The trunk path generating process selects adjoining dis blocks from the floor as the blocks of the trunk path. Detail of the trunk path generating process will be described in the following section titled "(3) Trunk path generating process".

At STEP S104, a branch path generating process is executed. The branch path generating process selects bc blocks from the trunk path and generates branch paths from the bc blocks. Detail of the branch path generating process will be described in the following section titled "(4) Branch path generating process".

At STEP S105, a loop path generating process is executed. The loop path generating process selects one block from the trunk path and another block from one of the branch paths, then generates a path between the two selected blocks to generate one loop path. The loop path generating process repeats above-mentioned process Is times in order to generate Is loop paths. Detailed description of the process will be described in the following section titled "(5) Loop path generating process".

One end of a branch path is connected to the trunk path and the other end is dead-end. STEP S106 judges whether neighboring blocks of a dead-end block are already used as one block of the trunk, branch or loop path, then combines the unused blocks in order to generate a room.

(3) Trunk Path Generating Process

Figure 7:
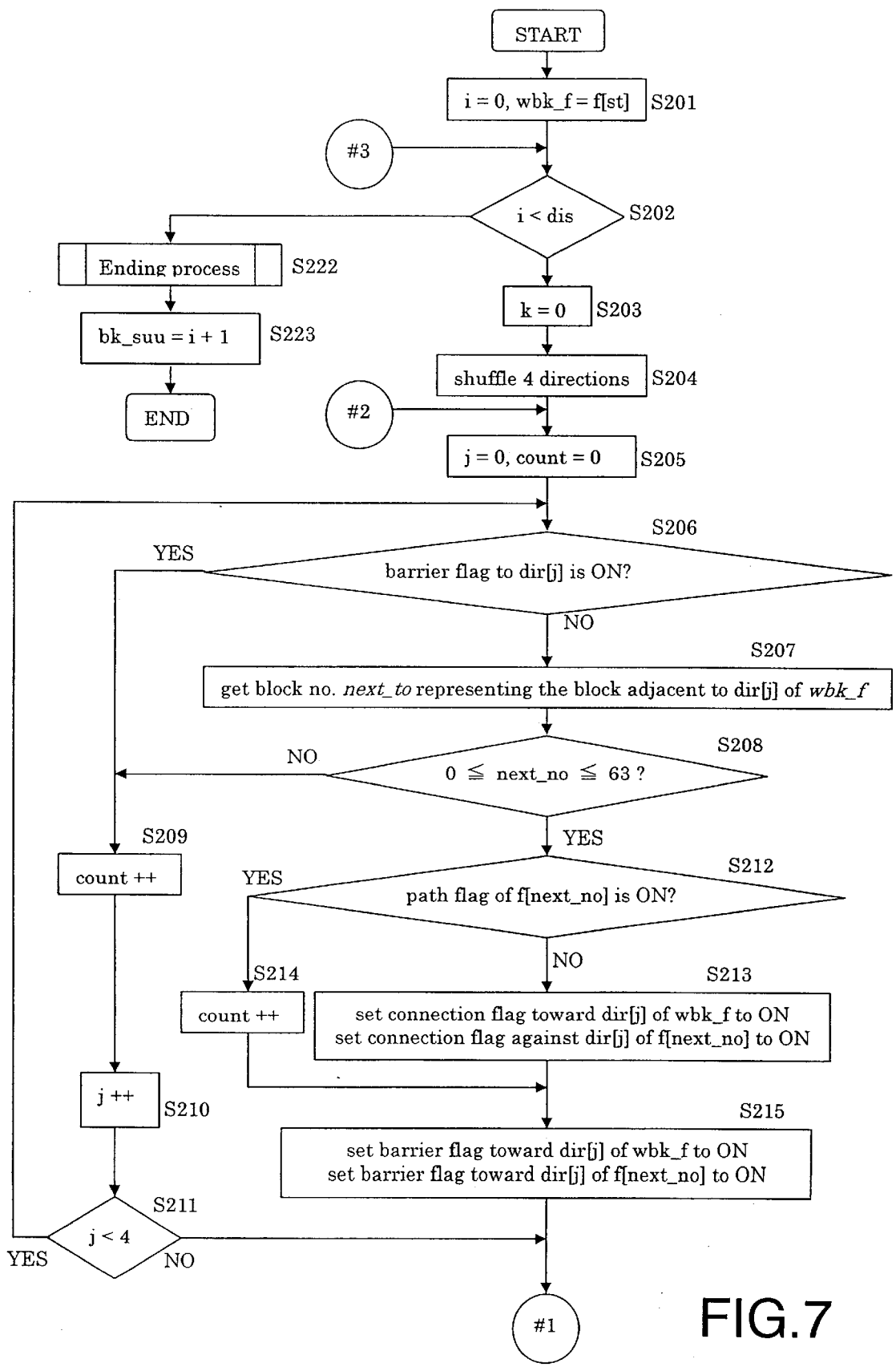
FIG. 7 is a flowchart of the trunk path generating process S103.
Figure 8:
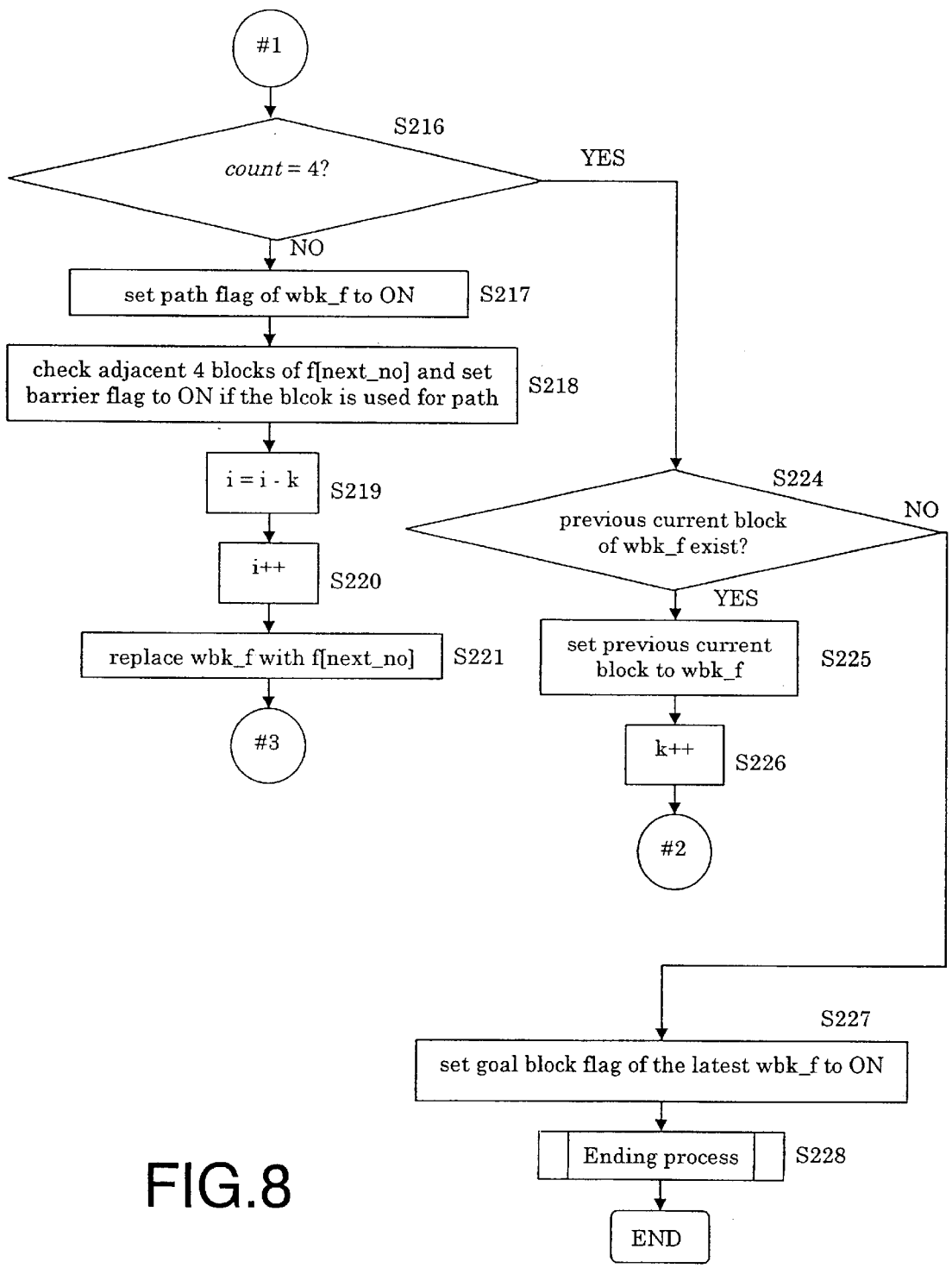
FIG. 8 is a flowchart of the trunk path generating process S103.

With reference to FIGS. 7 and 8, the trunk path generating process will be described in detail. In FIGS. 7 and 8, following variables are used. i, j, k and count are loop counters for deciding terminal condition of a loop. bk__suu is amount of blocks that is already used for paths. wbk_f is the flag group of the block which is currently operated (hereinafter referred to as current block). next__no is one of block numbers each of which represents that the block is adjacent to the current block and is available for combining with the current block into a path. Each of dir [0], dir [1], dir [2] and dir [3] represents one of four directions east, west, south and north, and is assigned one of values 0 (east), 1 (west), 2 (south) and 3 (north) without repetition (STEP S204).

At STEP S206, the barrier flag corresponding to the direction dir [j] of the current block is checked. When the barrier flag is OFF, first, it is checked whether the block next__no exists in the floor (STEP S208), and if the block next__no exists, then it is checked whether the path flag of the block next__no is ON (STEP S212).

If the path flag is OFF at STEP S212, then both the connection flag to direction dir [0] of the current block and the connetion flag opposite to direction dir [0] of the block next__no are set to ON (STEP S213).

If the path flag is ON at STEP S212, then count is incremented (STEP S214). Next, whether the path flag is ON or OFF at STEP S212, both the barrier flag to direction dir [j] of the current block and the barrier flag opposite to direction dir [0] of the block next__no are set to ON (STEP S215).

If the barrier flag to direction dir [j] of the current block is ON, or if the block next__no does not exist in the floor, then count and j are incremented (STEP S209, S210). Next, if j is under four, then a barrier flag to new direction of the current block is checked, and if j is four, namely, if all barrier flags of the current block are ON, STEP S211 is next to STEP S216.

At STEP S216, count is compared with four. If count is under four, then the path flag of the current block is set to ON (STEP S217).

Next, it is checked whether each one of four blocks adjacent to the block next__no is already used as a part of path or not. If the adjacent block is already used, the barrier flag of the block next__no toward the adjacent block is set ON and the barrier flag of the adjacent block toward the block next__no is set ON (STEP S218). According to STEP S218, the trunk path has no loop.

Figure 9:
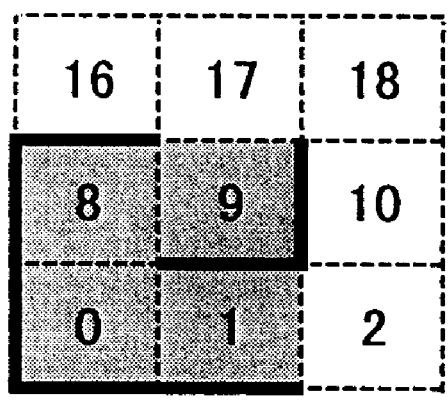
FIG. 9 is a part of the floor shown in FIG. 3 for describing the trunk path a generating process S103.

Turning to FIG. 9, it is described when the current block is block 9 and the block next__no is the block 1 as an example. In this case, when the north block of the block 1 is checked, the block 9 is already used as a part of a path. Consequently, the north barrier flag (seventh bit) of the block 1 is set to ON and the south barrier flag (sixth bit) of the block 9 is set to ON. Next, i is decremented by the same time the loop #2 shown in FIGS. 7 and 8 has been repeated (STEP S219). Then, i is incremented by one (STEP S220). Next, the block next__no is set as a new current block. After each one time the loop #3 shown in FIGS. 7 and 8 is repeated, one block is added to the trunk path.

Turning again to STEP S216, if count is equal to four, the process is continued as following. If the block previous to the current block exists, then the previous block is set as the current block again (STEP S225) and k is incremented (STEP S226).

Figure 10:
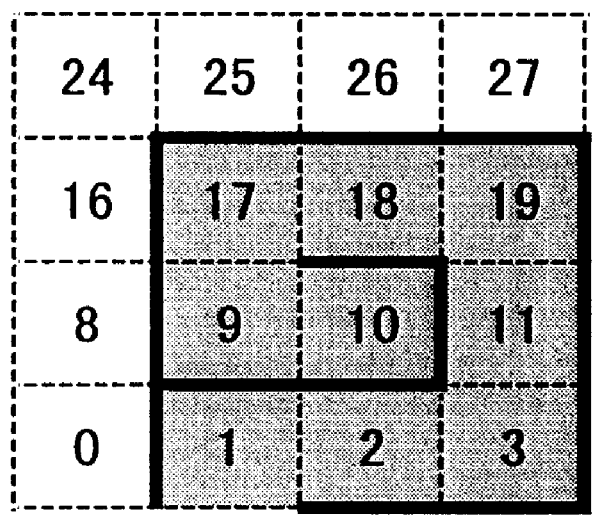
FIG. 10 is a part of the floor shown in FIG. 3 for describing the trunk path generating process S103.

With reference to FIG. 10 as an example, the trunk path is composed of the block 1, 2, 3, 11, 19, 18, 17, 9 and 10 in order. In this example, the start block of the maze is the block 1 and the last current block is the block 10.

When the block 10 is the current block, the previous current block (the block 9) is set as the current block again. If the start block (the block 1), which has no previous block, is set as the current block again because of repetition of setting back to previous block, then the goal block flag of the last current block (the block 10) is set to ON (STEP S227), the ending process, which will be described later, is executed (STEP S228), and the trunk path generating process S103 is ended. In this case, the number of blocks of the trunk path is not always equal to the trunk path length dis.

When i arrives at the trunk path length dis according to repetition of the loop #3 (STEP S202), the ending process at STEP S222 is executed, bk_suu is set to i+1 (STEP S223), and the trunk path generating process is ended. bk_suu represents amount of the blocks each of that has already been set as a part of a path, and further, each block of the path is numbered from 0 to bk_suu−1 in order. These numbers are given to not only the blocks of the trunk path, but also the blocks of the branch path.

Above-mentioned ending process (STEP S222 and S228) is described as following. When the loop #2 is executed at least one time (when k becomes over zero) during the trunk path generating process S103, previous current block has been set back as current block again at least one time because next current block does no exist.

Figures 11, 12:
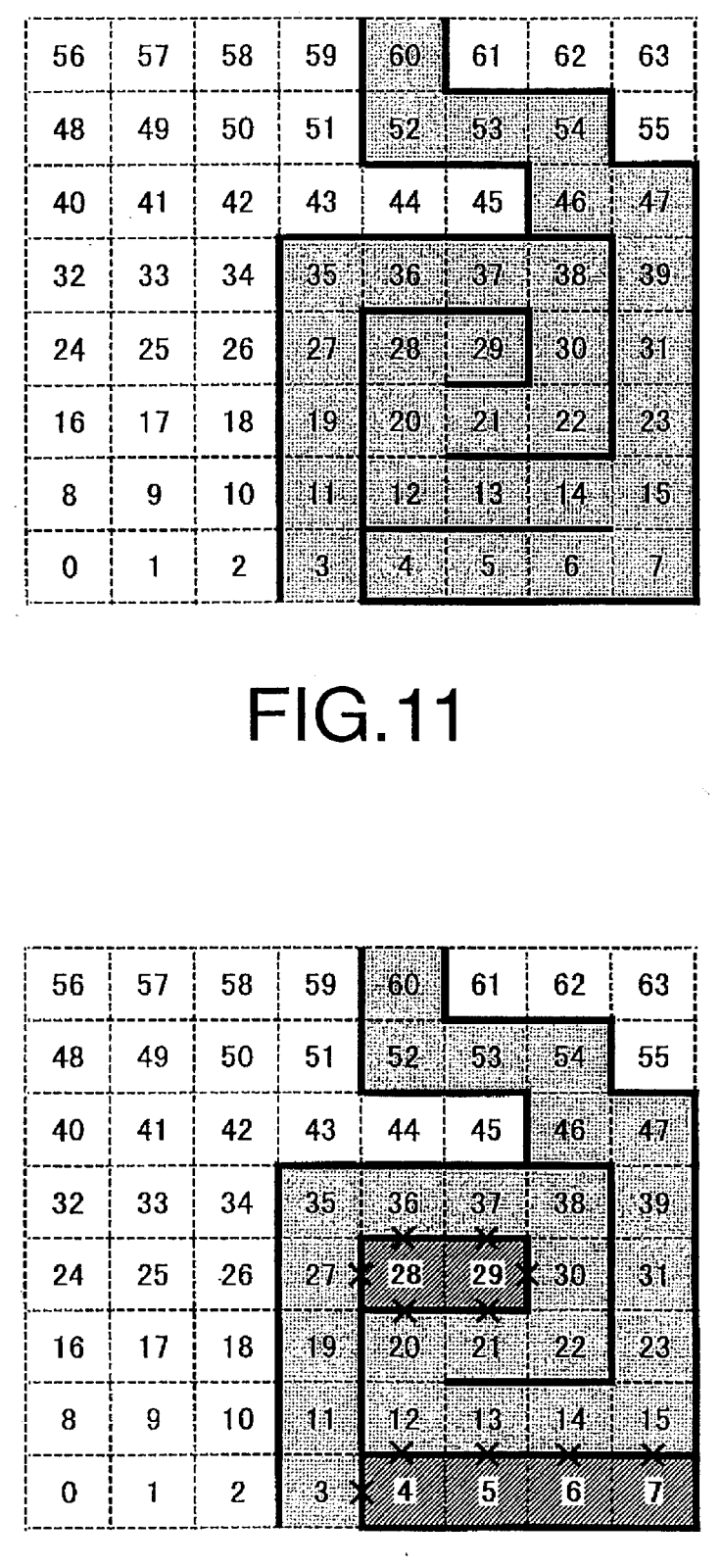

In this case, the trunk path would separate some paths as shown in FIG. 11. In FIG. 11, the trunk path separates at the blocks 20 and 15. In the trunk path generating process, the trunk path should be an unforked. Therefore, unnecessary blocks should be removed from the trunk path. The ending process sets the following flags OFF: path and connection flags of the blocks 4, 5, 6, 7, 28 and 29; the south connection flag of the block 15 that connects unnecessary block to the trunk path; the north connection flag of the block 20; and barrier flags where "X"s are marked in FIG. 12.

(4) Branch Path Generating Process

Figure 13:
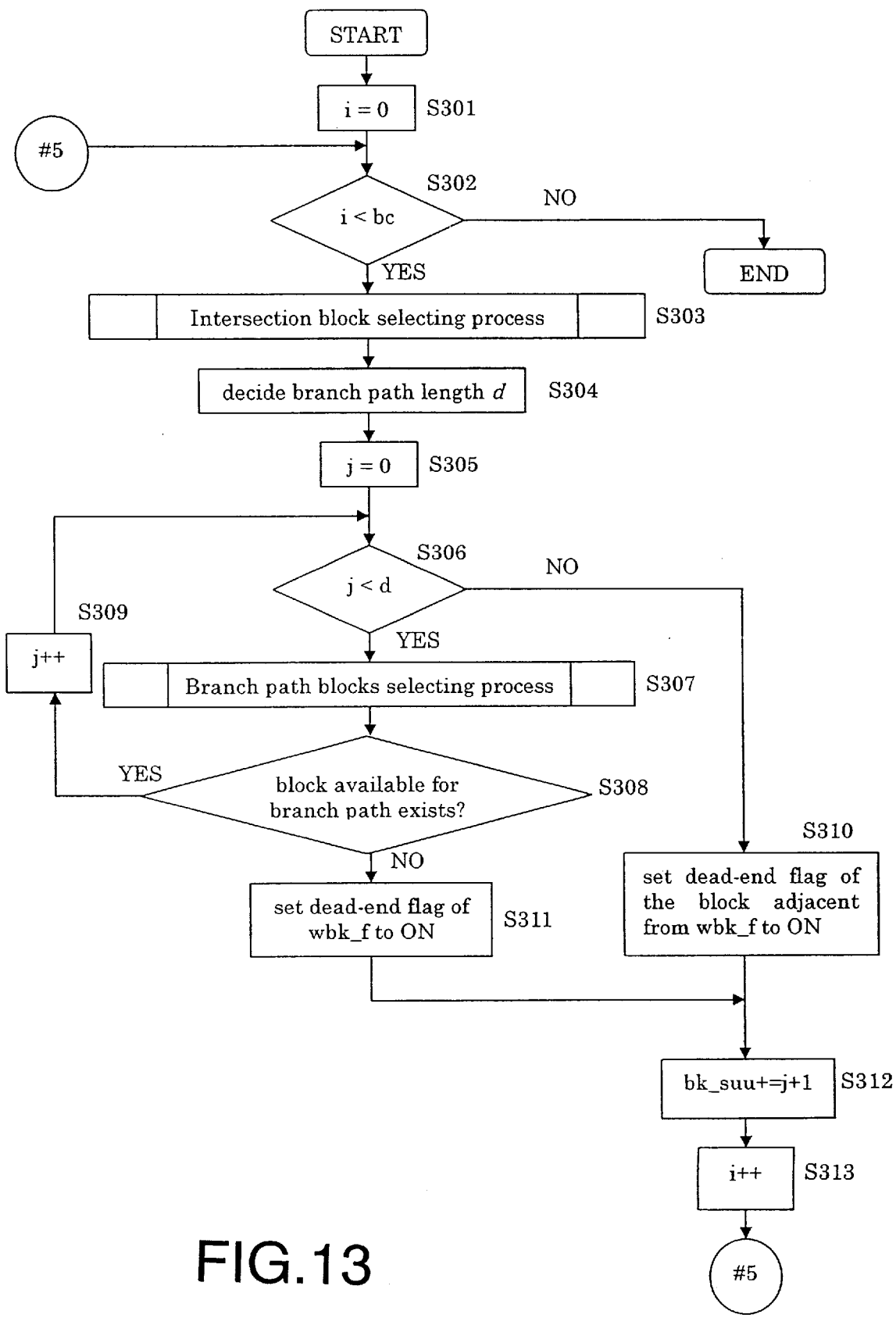
FIG. 13 is a flowchart of the branch path generating process S104.

After generating the trunk path, the branch path generating process S104 as shown in FIG. 13 is executed. In FIG. 13, branch path length dis used as a variable in addition to the variables in FIGS. 7 and 8. Branch path length d represents the number of blocks forming one branch path except an intersection block, which is one block of the trunk path and is starting point of the branch path.

The branch path generating process generates a branch path as following. First, An intersection block is selected from blocks that are already set as the trunk path or a branch path at the intersection block selecting process described in detail later (STEP S303). Next, branch path length d is randomized from predetermined range, e.g. 1 to 3 (STEP S304).

Then, blocks for the branch path are selected (STEP S307) one after another in the same way as the trunk path generating process until d blocks have been selected or there has been no block available for the branch path. One block is selected for the branch path each time the loop from S306 to S309 is executed.

If j arrives at d, then the dead-end block flag of the block direction dir [j] adjacent from the current block is set to ON, and j is added to bk_suu. Further, the loop #5 shown in FIG. 13 is repeated until i incremented at STEP S313 has arrived at the number of branch path bc.

If there is no adjacent block available for the branch path, namely, the current block is at dead-end, then the dead-end block flag of the current block is set to ON (STEP S311) and j is added to bk_suu (STEP S312). According to these steps, a block newly selected for the branch path becomes available for an intersection block of other branch path.

Figure 14:
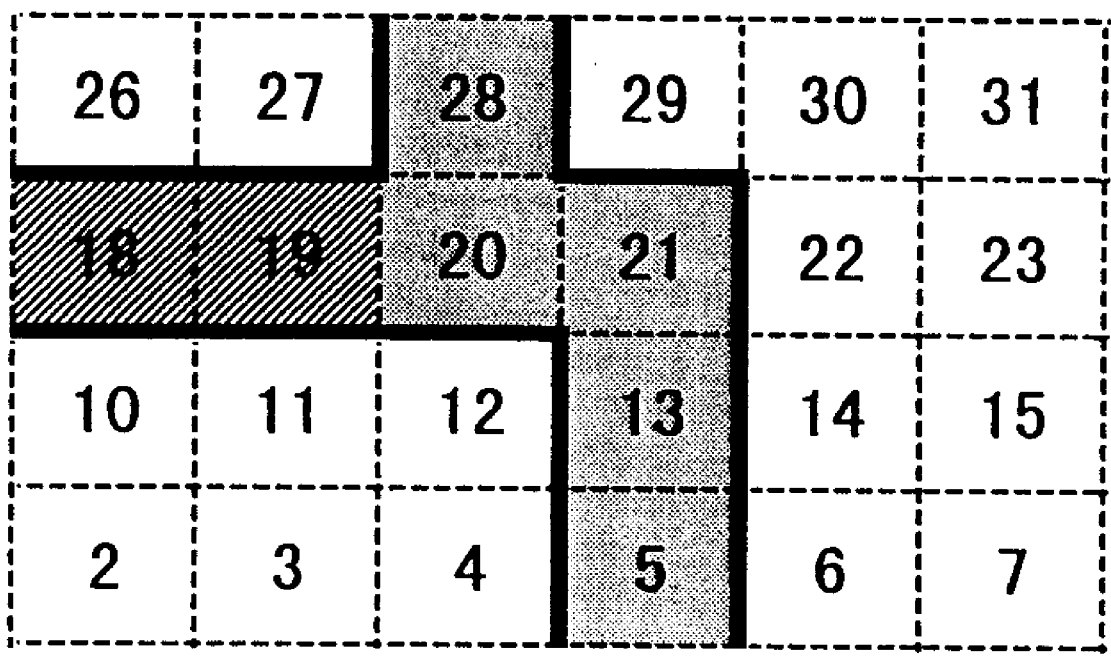
FIG. 14 is a part of the floor shown in FIG. 3 for describing the branch path generating process S104.

For example, in FIG. 14, a trunk path includes blocks 5, 13, 21, 20 and 28. The block 20 is selected as an intersection block and is combined with blocks 19 and 18 as a branch path. In this case, not only blocks 5,13, 21, 20 and 28 but also blocks 19 and 18 are available for an intersection block of a newly generated branch path.

Figure 15:
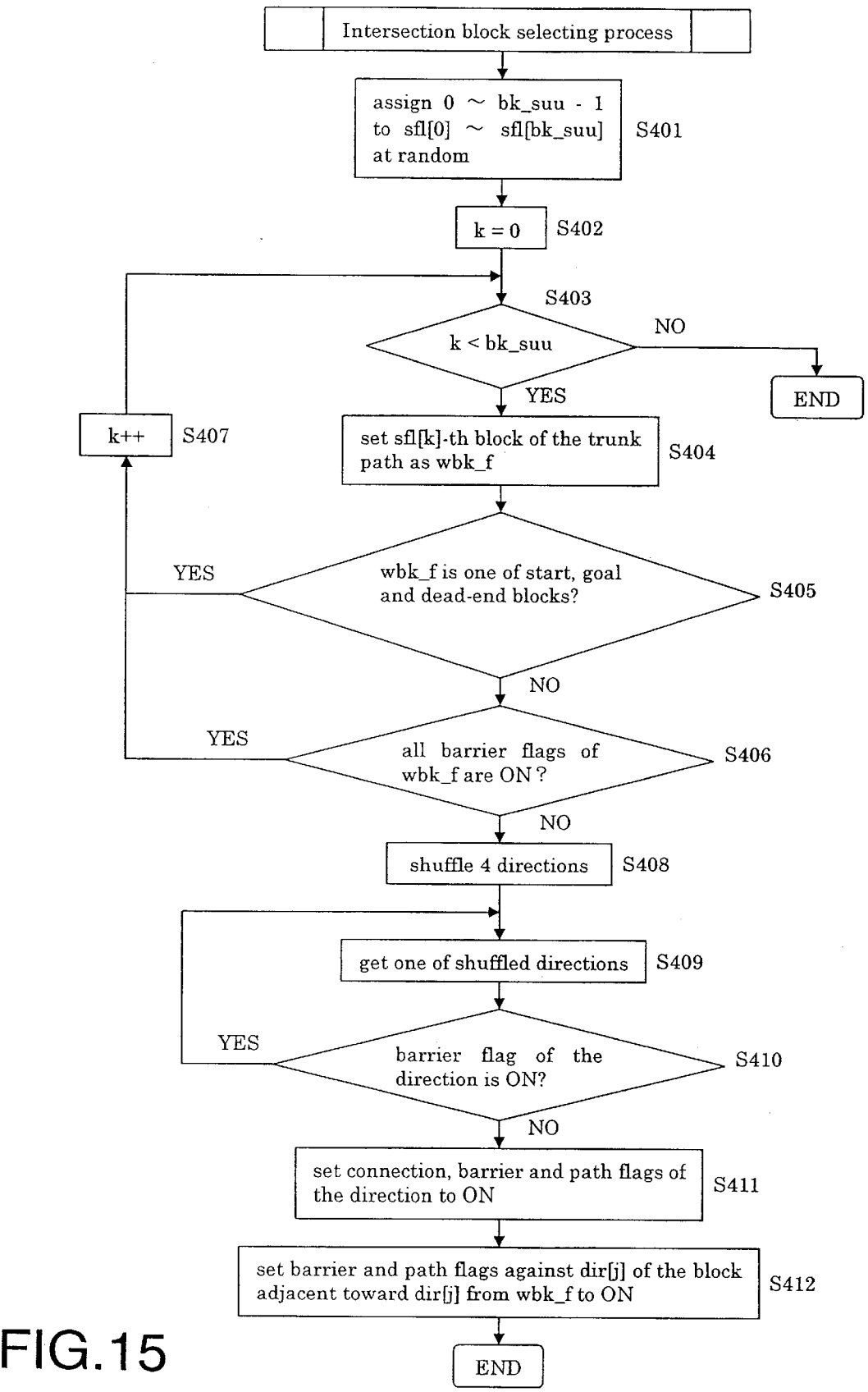
FIG. 15 is a flowchart of the intersection block selecting process S303.

With reference to FIG. 15, above-mentioned intersection block selecting process S303 will be described below. In FIG. 15, sfl [0] through sfl [bk_suu−1] are used as variables in addition to above-mentioned variables.

First, each one of sfl [0] to sfl [bk_suu−1] is assigned at random one value of 0 to bk_suu−1 without repetition of same value (STEP S401).

Next, the sfl [k]-th block of the trunk path is selected as the current block (STEP S404). If the current block is the start block, the goal block or the dead-end block (STEP S405) or all barrier flags of the current block are ON (STEP S406), and then k is incremented from 0 to bk_suu (STEP S407).

If the current block is neither the start block, nor the goal block, nor the dead-end block and all barrier flags of the current block are OFF, then a barrier flag and a connection flag of the current block toward one randomized direction are set to ON (STEP S411). Further, the barrier flag opposite to the randomized direction of the block adjacent toward the randomized direction from the current block is set to ON (STEP S412).

(5) Loop Path Generating Process

Figure 16:
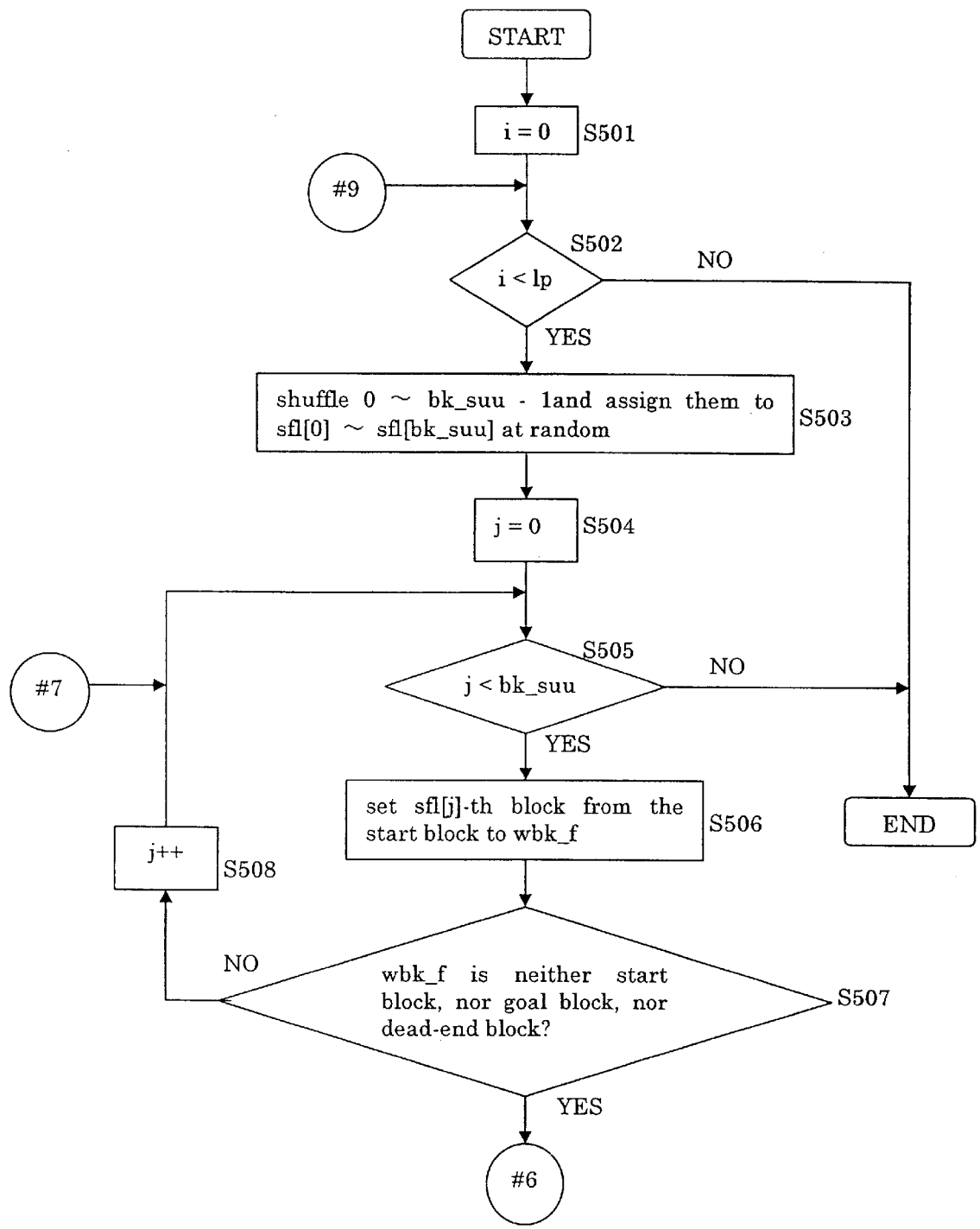
FIG. 16 is a flowchart of the loop generating process S105.
Figure 17:
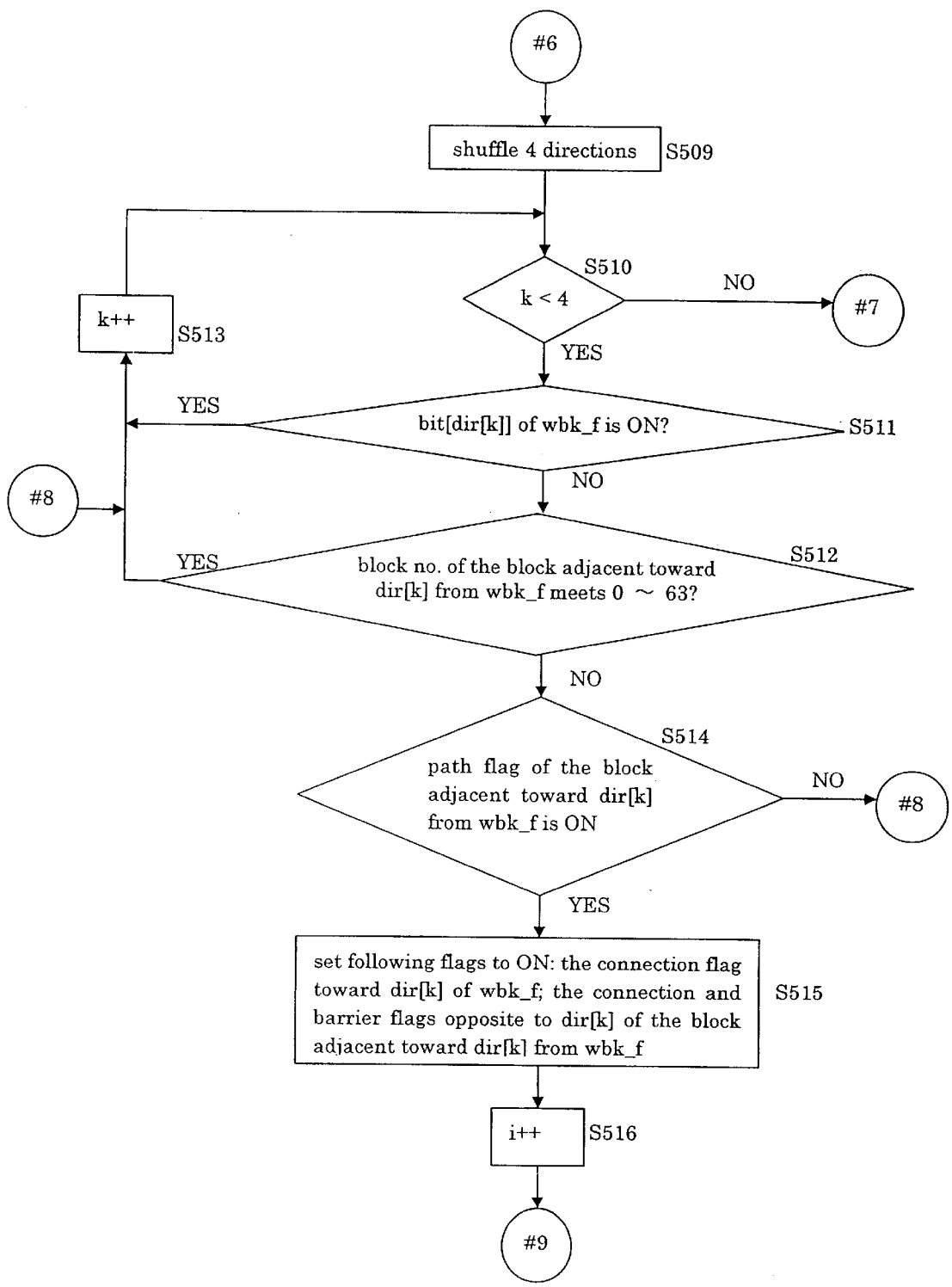
FIG. 17 is a flowchart of the loop generating process S105.

After the trunk path generating process and the branch path generating process has been executed, the loop path generating process shown in FIGS. 16 and 17 is executed. The loop path generating process connects two blocks that is adjacent each other and don't combine together as one path in order to form ringed paths.

One of the blocks which has been selected for the trunk path or a branch path is randomized to be set as the current block wbk_f (STEP S503 to S506).

After confirming that the current block is neither the start block, nor the goal block, nor the dead-end block, it is checked that the connection flag toward the randomized direction dir [k] is OFF, and the block adjacent toward the direction dir [k] from the current block exists (STEP S512). If the connection flag is ON or the adjacent block does not exist, then k is incremented (STEP S513) and STEP S511 and S512 are repeated. If all four directions of the current block does not meet the conditions of STEP S512 and S513 (STEP S510), the loop #7 shown in FIGS. 16 and 17 returns to STEP S505 in order to change current block.

If there is a direction where both conditions of STEP S512 and S513 are "NO", the path flag of the block adjacent toward dir [k] from wbk_f is checked (STEP S514). If the path flag is ON, corresponding connection flag and barrier flag of the current block and its adjacent block is set to ON (STEP S515), j is incremented (STEP S516), and the loop #9 shown in FIGS. 16 and 17 returns to STEP S502. STEP S501 to S516 are repeated until i arrives at the number of loop Ip.

Above-mentioned embodiment have been described with reference to generating a maze map which is composed of one floor which is composed of 8×8 blocks. Therefore, that skilled in the art can apply the essence of the present invention to generating a maze map which is composed of plural floors according to repeat the method of above-mentioned embodiment and further, to generating a maze map whose floor is composed of m×n (m and n are natural numbers) blocks.

When a maze map is composed of plural floors each of which is composed of blocks of the same array, the start block of one floor A may suitably be corresponded with the goal block of the floor under the floor A. In this case, the maze would have reasonable structure.

According to the present invention, rooms in a maze are generated after generating paths. Therefore, arrangement of paths is not limited under that of rooms. Consequently, the present invention can generate more complex maze.

Further, according to the present invention, the trunk path that connects the start and goal blocks is generated at first so that the maze always has correct path.

And further, according to the present invention, complexity of maze is easily adjustable by adjusting trunk path length dis, branch path length d, the number of branch paths bc, and the number of loops Ip.

What is claimed is:

1. A method of automatically generating a maze map by computer, the maze map including at least one floor that is composed of arrayed rectangular blocks, the floor including a start block and a goal block, the start and goal blocks being connected with each other via at least a trunk path, the method comprising the steps of:
    (a) generating the floor composed of plural rectangular blocks;
    (b) designating one of the blocks from the floor as the start block;
    (c) designating a trunk path which is a sequence of blocks designated from the floor and which starts from the start block;
    (d) designating at least one block as an intersection block from the trunk path; and
    (e) designating at least one branch path which is a sequence of blocks designated from the floor and which starts from the intersection block.

2. The method claimed in claim 1, wherein the floor is a two-dimensional array composed of m×n rectangular blocks (m and n are natural numbers).

3. The method claimed in claim 1, wherein when the trunk path is composed of X rectangular blocks (X is a natural number) $B_1, B_2, B_3 \ldots B_x$, the step (c) designates the blocks $B_1, B_2, B_3 \ldots B_x$ according to the steps of:
    (c1) designating the start block $B_1$, as the current block which has been currently selected as one block of the trunk path;
    (c2) selecting one of the blocks adjacent to the current block;
    (c3) designating the selected block as the next current block; and
    (c4) repeating the steps (c2) and (c3) until the block $B_x$ is designated.

4. The method claimed in claim 1, wherein when the branch path is composed of X rectangular blocks (X is a natural number) $B_1, B_2, B_3 \ldots B_x$, the step (e) designates the blocks $B_1, B_2, B_3 \ldots B_x$ according to the steps of:
    (e1) designating the intersection block $B_1$ as the current block which has been currently selected as one block of the branch path;
    (e2) selecting one of the blocks adjacent to the current block;
    (e3) designating the selected block as the next current block; and
    (e4) repeating the steps (e2) and (e3) until the block $B_x$ is designated.

5. A method of automatically generating a maze map by computer, the maze map being composed of a plurality of floors each of that is composed of arrayed rectangular blocks, the floor including both a start block and a goal block, the start and goal blocks being connected with each other via at least a trunk path, the method generating at least one of the floors according to the method claimed in claim 1.

6. A computer-readable storage medium storing a program for generating a maze map, the maze map including at least one floor that is composed of arrayed rectangular blocks, the floor including a start block and a goal block, the start and goal blocks being connected with each other via at least a trunk path, the program comprising the processes of:
    (a) generating the floor composed of plural rectangular blocks;
    (b) designating one of the blocks from the floor as the start block;
    (c) designating a trunk path which is a sequence of blocks designated from the floor and which starts from the start block;
    (d) designating at least one block as an intersection block from the trunk path; and
    (e) designating at least one branch path which is a sequence of blocks designated from the floor and which starts from the intersection block.

7. The computer-readable storage medium claimed in claim 6, wherein the floor is a two-dimensional array composed of m×n rectangular blocks (m and n are natural numbers).

8. The computer-readable storage medium claimed in claim 6, wherein when the trunk path is composed of X rectangular blocks (X is a natural number) $B_1, B_2, B_3 \ldots B_x$, the process (c) designates the blocks $B_1, B_2, B_3 \ldots B_x$ according to the processes of:
    (c1) designating the start block $B_1$, as the current block which has been currently selected as one block of the trunk path;
    (c2) selecting one of the blocks adjacent to the current block;
    (c4) repeating the processes (c2) and (c3) until the block $B_x$ is designated.

9. The computer-readable storage medium claimed in claim 1, wherein when the branch path is composed of X rectangular blocks (X is a natural number) $B_1, B_2, B_3 \ldots B_x$, the process (e) designates the blocks $B_1, B_2, B_3 \ldots B_x$ according to the processes of:
    (e1) designating the intersection block $B_1$ as the current block which has been currently selected as one block of the branch path;
    (e2) selecting one of the blocks adjacent to the current block;
    (e3) designating the selected block as the next current block; and
    (e4) repeating the processes (e2) and (e3) until the block $B_x$ is designated.

10. A computer-readable storage medium storing a program for generating a maze map, the maze map being composed of a plurality of floors each of that is composed of arrayed rectangular blocks, the floor including both a start block and a goal block, the start and goal blocks being connected with each other via at least a trunk path, the program generating at least one of the floors according to the program claimed in claim 6.

11. A video game device comprising the computer-readable storage medium claimed in claim 6, being operable according to the program.

12. A video game device for generating a maze map, the maze map including at least one floor that is composed of arrayed rectangular blocks, the floor including a start block and a goal block, the start and goal blocks being connected with each other via at least a trunk path, the video game device comprising:

(a) means for generating the floor composed of plural rectangular blocks;
(b) means for designating one of the blocks from the floor as the start block;
(c) means for designating a trunk path which is a sequence of blocks designated from the floor and which starts from the start block;
(d) means for designating at least one block as an intersection block from the trunk path; and
(e) means for designating at least one branch path which is a sequence of blocks designated from the floor and which starts from the intersection block.

13. The video game device claimed in claim 12, wherein the floor is a two-dimensional array composed of m×n rectangular blocks (m and n are natural numbers).

14. The video game device claimed in claim 12, wherein when the trunk path is composed of X rectangular blocks (X is a natural number) $B_1, B_2, B_3 \ldots B_x$, means (c) designates the blocks $B_1, B_2, B_3 \ldots B_x$ and comprises:

(c1) means for designating the start block $B_1$ as the current block which has been currently selected as one block of the trunk path;
(c2) means for selecting one of the blocks adjacent to the current block;
(c3) means for designating the selected block as the next current block; and
(c4) means for repeatedly activating means (c2) and (c3) until the block $B_x$ is designated.

15. The video game device claimed in claim 12, wherein when the branch path is composed of X rectangular blocks (X is. a natural number) $B_1, B_2, B_3 \ldots B_x$, means (e) designates the blocks $B_1, B_2, B_3 \ldots B_x$ and comprises:

(e1) means for designating the intersection block $B_1$ as the current block which has been currently selected as one block of the branch path;
(e2) means for selecting one of the blocks adjacent to the current block;
(e3) means for designating the selected block as the next current block; and
(e4) means for repeatedly activating means (e2) and (e3) until the block $B_x$ is designated.

\* \* \* \* \*